US007394508B2

(12) United States Patent
Chen et al.

(10) Patent No.: US 7,394,508 B2
(45) Date of Patent: Jul. 1, 2008

(54) DISPLAY DEVICE

(75) Inventors: Shyh-Feng Chen, Hualien County (TW); Chu-Yu Liu, Hsinchu County (TW); Kuei-Sheng Tseng, Taoyuan County (TW); Po-Jen Chiang, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 276 days.

(21) Appl. No.: 11/164,021

(22) Filed: Nov. 8, 2005

(65) Prior Publication Data

US 2007/0035491 A1 Feb. 15, 2007

(30) Foreign Application Priority Data

Aug. 11, 2005 (TW) .............................. 94127269 A

(51) Int. Cl.
*G02F 1/13* (2006.01)
*G02F 1/1333* (2006.01)
*G09G 3/36* (2006.01)

(52) U.S. Cl. ........................... 349/54; 349/192; 345/87; 345/98

(58) Field of Classification Search ................... 349/54, 349/192; 345/87, 98, 100
See application file for complete search history.

(56) References Cited

U.S. PATENT DOCUMENTS 6,525,705 B1 2/2003 Ishii et al.
2005/0174316 A1 * 8/2005 Kang ......................... 345/100

FOREIGN PATENT DOCUMENTS

CN 1534363 10/2004

* cited by examiner

*Primary Examiner*—Frank G Font
*Assistant Examiner*—Michael P Mooney
(74) *Attorney, Agent, or Firm*—Jianq Chyun IP Office

(57) ABSTRACT

A display device includes a display panel, a driving circuit and a repair line. The display panel has a display region and a peripheral circuit region adjacent to the display region. The peripheral circuit region has a driving circuit bonding region and a plurality of conductive wires extending from the display region into the driving circuit bonding region. The driving circuit is electrically connected to the display region through the driving circuit bonding region and the conductive wires. The repair line is distributed in the peripheral circuit region and the driving circuit, wherein the repair line has a repair portion located between the driving circuit bonding region and the display region. As described above, the repair process of the display device provided by the present invention is simpler so as to save the cost and time of the successive processes.

14 Claims, 8 Drawing Sheets

DISPLAY DEVICE

CROSS-REFERENCE TO RELATED APPLICATION

This application claims the priority benefit of Taiwan application serial no. 941 27269, filed on Aug. 11, 2005. All disclosure of the Taiwan application is incorporated herein by reference.

BACKGROUND OF THE INVENTION

1. Field of Invention

The present invention relates to a display device, and particularly to a display device with repair lines.

2. Description of the Related Art

In the past, display devices equipped with cathode ray tube (CRT) had drawbacks such as bulky, heavy, high-radiation, lower definition and so on. To overcome such problems, novel flat panel display technologies have been constantly developed. These newly developed flat panel displays are advantageous as they are light, slim, electricity-saving, low-radiation, full color, etc. These flat panel display devices include liquid crystal display (LCD) devices, plasma display panel (PDP) devices and organic electroluminescent display (OELD) devices. Among these flat panel display devices, the most outstanding and popular one is LCD device, which is counted as the most mature in terms of technology and has widespread applications in handsets, digital cameras, digital video cameras (DVs), personal digital assistants (PDAs), LCD TV sets and so on.

Although the technology of LCD devices is almost fully developed today, some defects are still unavoidable during the manufacturing process. During displaying images on an LCD, these defects will make a viewer feel uncomfortable. If the LCDs with defects are discarded, the production cost would be increased enormously. Generally speaking, it is very difficult to achieve defect-free rate by means of only improving the manufacturing technology. In other words, to advance a defect-repairing technology in LCD panel production is critically important. In prior art, a repair method of LCD panels includes laser welding and laser cutting. However, in consideration of practical wiring designs of LCD panels, not each of open-lines is able to be repaired quickly; some open-lines are even not repairable.

FIG. 1 is a schematic structure diagram of an LCD device. Referring to FIG. 1, an LCD device 100 includes an LCD panel 110, a data control circuit board 120, a scan control circuit board 130, a plurality of data drivers 140 and a plurality of scan drivers 150. The LCD device 100 has a plurality of data lines 112, a plurality of scan lines 114 and a repair line 116. The plurality of data drivers 140 is disposed between the data control circuit board 120 and the LCD panel 110 and is electrically connected to the data control circuit board 120 and the plurality of data lines 112 of the LCD panel 110. The plurality of scan drivers 150 is disposed between the scan control circuit board 130 and the LCD panel 110 and is electrically connected to the scan control circuit board 130 and the plurality of scan lines 114 of the LCD panel 110. It can be seen from FIG. 1, the data drivers 140 and the scan drivers 150 are TAB packages.

The data signal of displayed images are delivered by the data control circuit board 120 to the data drivers 140 first, followed by sending the signal to the data lines 112 while the scan signal of displayed images are delivered by the scan control circuit board 130 to the scan drivers 150 first, followed by sending a scan signal to the scan lines 114. By means of the scan lines 114 to deliver the scan signal of displayed images to active components (not shown in the figure) of the LCD panel 110 and by means of the data lines 112 to deliver the data signal of displayed images to pixel electrodes (not shown in the figure) corresponding to the active components, the LCD panel 110 is able to achieve the display function.

After an LCD panel 110 is fabricated, usually a so-called "cell test" will be carried out to check whether any defects occur on the LCD panel 110 or not. Once a disconnection defect is revealed on the LCD panel 110, a repair line 116 on the LCD panel 110 is used for repairing. For example, when a data line 112 on the LCD panel 110 is damaged, a laser welding process is performed at two welding points **116*a* and 116*b* for electrically connecting the repair line 116 and the damaged or broken data line 112, so that most of the functions of the damaged data line 112 can be restored by the repair line 116. Another cell test on the LCD panel 110 will be performed to secure the disconnection defect is repaired. However, since the trend for panel size is bigger and bigger and the resolution is higher and higher, a repair line 116 must be long enough to pass across more and more data lines 112; a too long repair line 116 leads to a parasitic capacitance and too larger resistance therewith. When a signal is transmitted through a long conductive wire, signal attenuation will occur resulting in poor displaying images of the LCD panel 110**.

FIG. 2A is a schematic structure diagram of another LCD device capable of improving signal attenuation with the LCD device 100 in FIG. 1. Referring to FIG. 2A, the LCD device 200 is disclosed in an embodiment in U.S. Pat. No. 6,525,705. The LCD device 200 includes an LCD panel 210, a data control circuit board 220, a scan control circuit board 230, a plurality of data drivers 240 and a plurality of scan drivers 250. The LCD device 200 has a plurality of data lines 212, a plurality of scan lines 214 and a first repair line 216 and a second repair line 218. The data control circuit board 220, the data drivers 240 and the scan drivers 250 are the same as those of the LCD device 100, i.e. the data control circuit board 120, the data drivers 140 and the scan drivers 150 of the LCD device 100. The scan control circuit board 230 has a third repair line 232 and an amplifying circuit 234. The amplifying circuit 234 is electrically connected to the third repair line 232 and disposed on the path of the third repair line 232. Besides, the third repair line 232 is electrically connected to the first repair line 216 and the second repair line 218 through the TAB packages.

When a damaged data line 212 on the LCD panel 210 is found, a laser welding is performed at two welding points **216*a* and 218*a* for electrically connecting the damaged data line 212 to the first repair line 216 and the second repair line 218, respectively. When the LCD panel 210 is bonded with the data control circuit board 220 and the scan control circuit board 230, a so-called "bonding process" is accomplished. At this time, the damaged data line 212 is able to perform most of the functions by means of the first repair line 216, the third repair line 232 and the second repair line 218. Since an amplifying circuit 234 is disposed on the path of the third repair line 232, the signal delivered by the third repair line 232 is amplified by the amplifying circuit 234, so that the signal attenuation due to transmission along a long distance of the repair line 218 is reduced. However, due to limited driving powers of the data drivers 240 and the scan drivers 250, the scheme is limited and not capable of solving the attenuation problem of the signal delivered by the repair lines 216 and 232 to meet the modern trend, where newly lunched panels have bigger and bigger screen and higher and higher resolution and therefore the parasitic capacitances of the repair lines 216 and 218** are larger and larger.

There are other conventional LCD panels with repair designs except for the above-described LCD devices 100 and 200. FIGS. 2B and 2C are schematic structure diagrams of two further LCD devices, both of which are able to eliminate the above-described signal attenuation problem. Referring to FIGS. 2B and 2C, the LCD devices 200' and 200" in FIGS. 2B and 2C are variations of the LCD device 200. The repair lines 222' and 222" on the data control circuit boards 220' and 220" are designed in subsection mode, by which the parasitic capacitances of the repair lines 222' and 222" are reduced and the open-line defects of the LCD panels 210' and 210" of the LCD devices 200' and 200" are repaired. The new problem herein is that the repaired LCD panels 21 0' and 210" of the LCD devices 200' and 200" are not able to be examined for whether the defects are fixed or not in the following cell test. Another problem is that such subsection mode design requires an additional successive process for connecting the repair lines on the data control circuit boards 220' and 220", which leads to an increase of production cost and time of the successive processes.

SUMMARY OF THE INVENTION

The present invention is directed to provide a display device capable of reducing the cost and time of the successive processes.

As embodied and broadly described herein, the present invention provides a display device including a display panel, a driving circuit and a repair line. The display panel includes a display region and a peripheral circuit region adjacent to the display region. The peripheral circuit region includes a driving circuit bonding region and a plurality of conductive wires extending from the display region into the driving circuit bonding region. The driving circuit is electrically connected to the display region through the driving circuit bonding region and the conductive wires. The repair line is distributed in the peripheral circuit region and the driving circuit and has a repair portion located between the driving circuit bonding region and the display region.

According to an embodiment of the present invention, the repair portion in the display device is a disconnected point or a switch.

According to an embodiment of the present invention, the display panel of the display device includes an LCD panel, a plasma display panel (PDP), an organic electroluminescent display panel (OELD panel), an inorganic electroluminescent display panel (IELD panel), a vacuum fluorescent display panel (VFD panel), a field emission display panel (FED panel) or an electro-chromic display panel (ECD panel).

According to an embodiment of the present invention, the conductive wires in the display device include data lines or scan lines.

According to an embodiment of the present invention, the driving circuit in the display device includes a driver and a control circuit board. The control circuit board drives the display panel through the driver.

According to an embodiment of the present invention, the driver in the display device is a flip-chip, which is directly and electrically connected to the driving circuit bonding region.

According to an embodiment of the present invention, the driver in the display device is a tape automation bonding package (TAB package), which is electrically connected to the control circuit board and the driving circuit bonding region.

According to an embodiment of the present invention, the driver in the display device is disposed on the control circuit board for electrically connecting the driving circuit bonding region.

According to an embodiment of the present invention, the display device can further include a first amplifier disposed in the driver, wherein the first amplifier is electrically connected to the repair line and suitable for amplifying the signal delivered by the repair line. Except for the first amplifier, the display device can further include, for example, a second amplifier disposed on the control circuit board, wherein the second amplifier is electrically connected to the repair line and suitable for amplifying the signal delivered by the repair line.

According to an embodiment of the present invention, the display device can further include a first switch disposed on the control circuit board, wherein the first switch is connected between the first amplifier and the repair line for deciding whether to output the signal amplified by the first amplifier to the repair line or not. Except for the first switch, the display device can further include, for example, a second switch disposed on the control circuit board, wherein the second switch is connected between the second amplifier and the repair line for deciding whether to output the signal amplified by the second amplifier to the repair line or not.

According to an embodiment of the present invention, the display device can further include a second amplifier disposed on the control circuit board, wherein the second amplifier is electrically connected to the repair line without incorporating with the first amplifier and suitable for amplifying the signal delivered by the repair line. In addition, the display device can further include, for example, a second switch disposed on the control circuit board, wherein the second switch is connected between the second amplifier and the repair line for deciding whether to output the signal amplified by the second amplifier to the repair line or not.

The repair line of the display device in the present invention has a repair portion which is disposed between the driving circuit bonding region and the display region, so that whether the defects of the repaired display panel are fixed or not can be checked by the successive cell test. Accordingly, the time and cost of the successive processes are reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The First Embodiment

Figure 1:
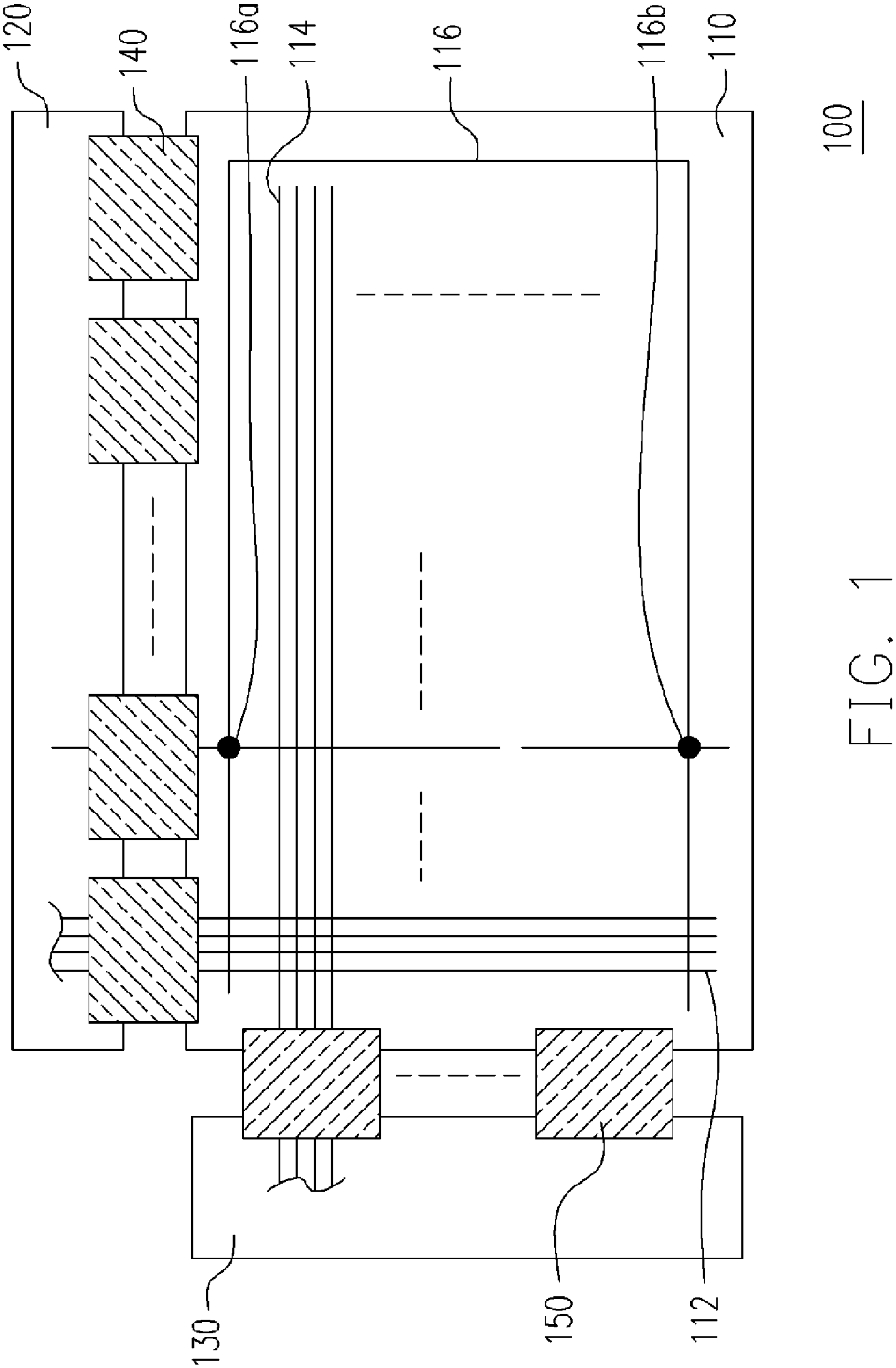
FIG. 1 is a schematic structure diagram of an LCD device.
Figure 2A:
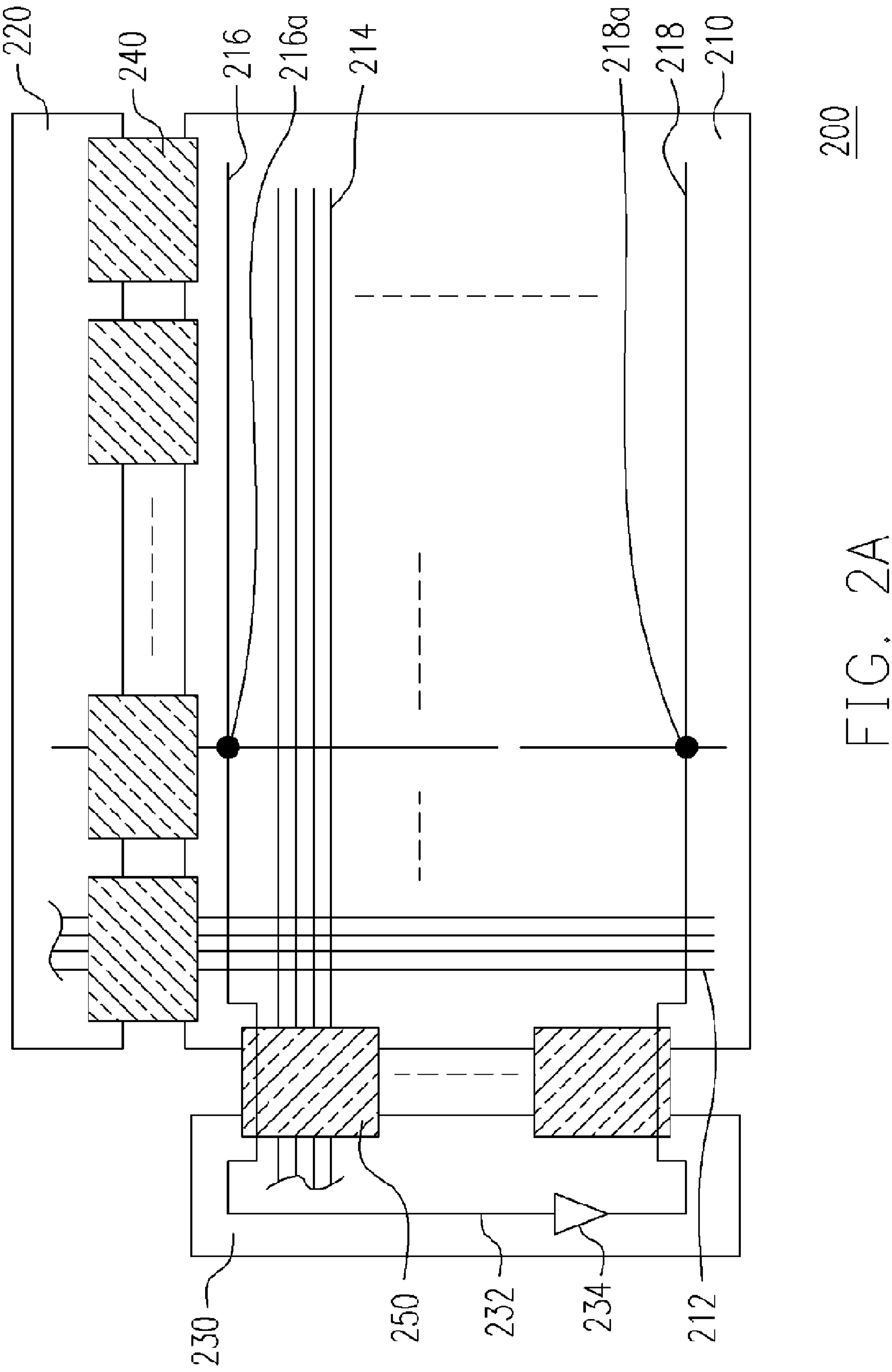
FIG. 2A is a schematic structure diagram of another LCD device.
Figure 2B:
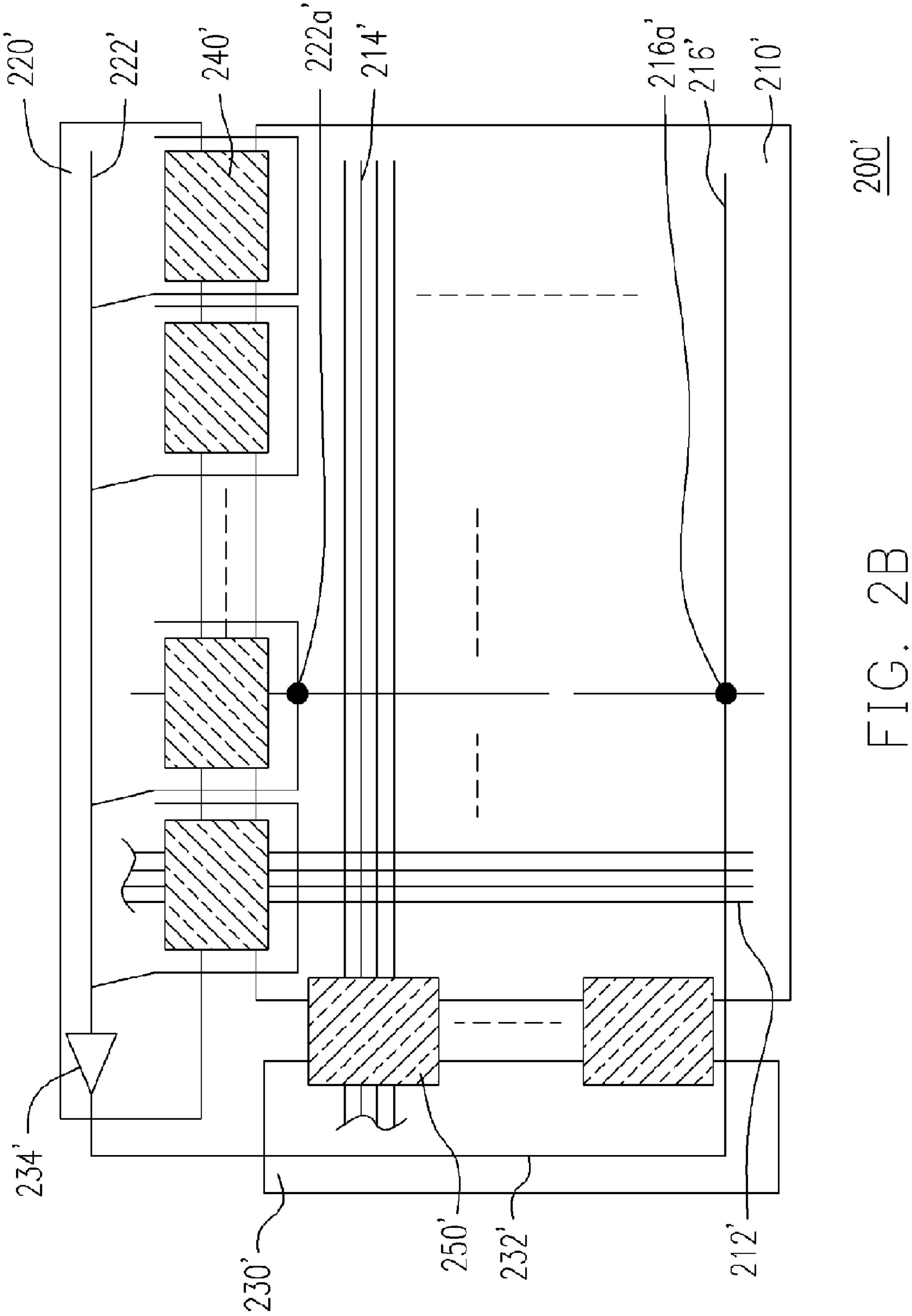
FIG. 2B is a schematic structure diagram of a further LCD device.
Figure 2C:
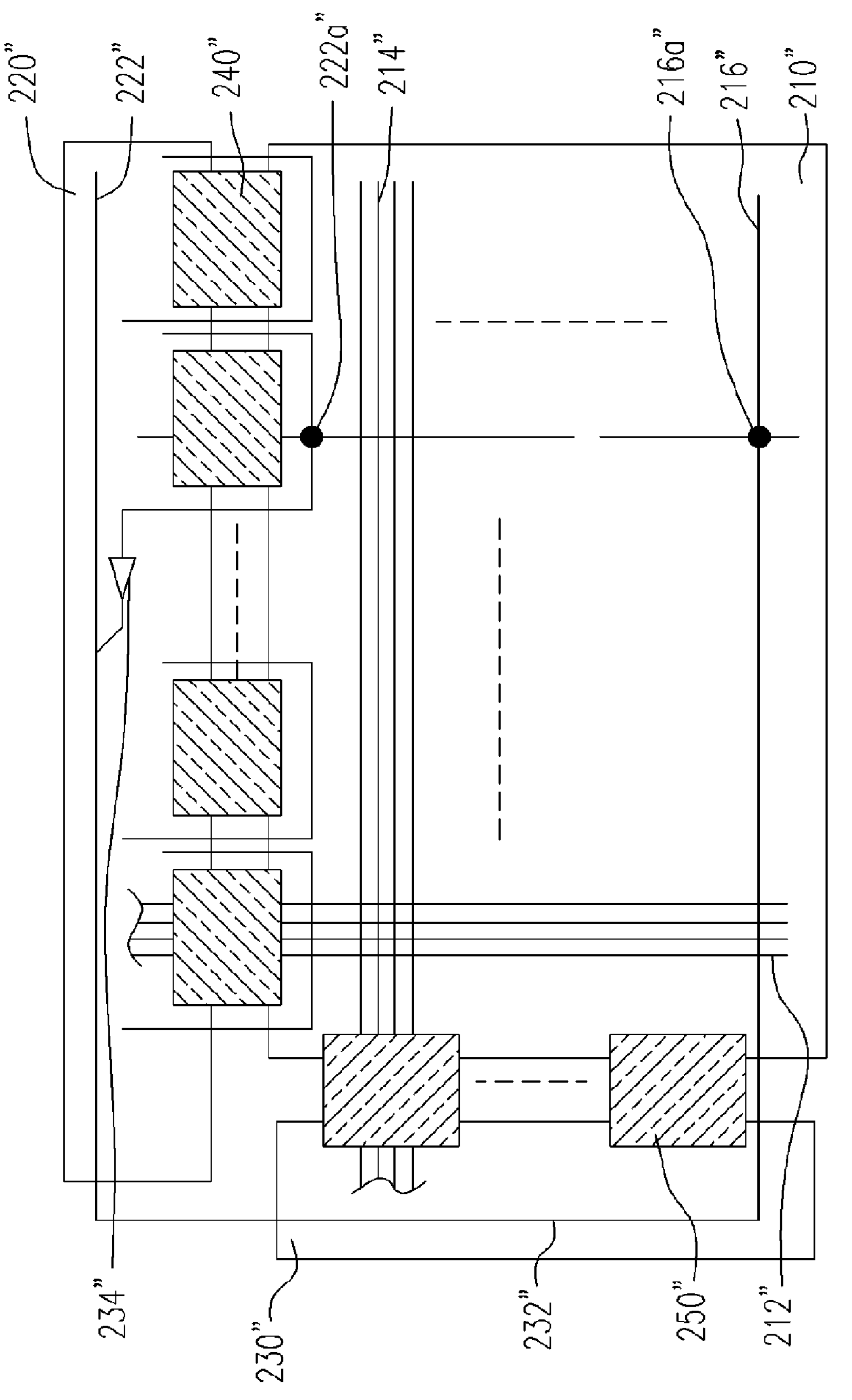
FIG. 2C is a schematic structure diagram of a further LCD device.
Figure 3:
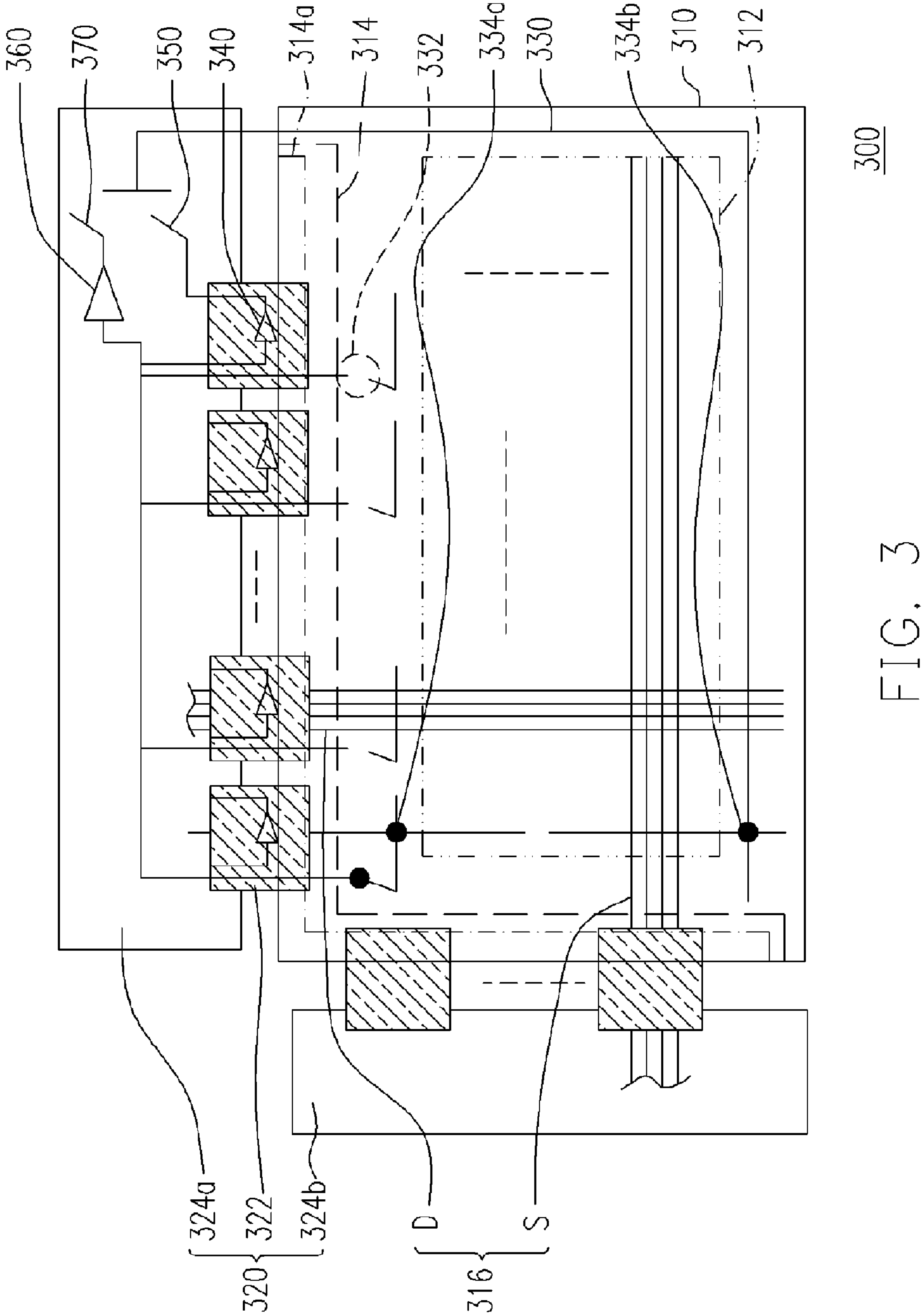
FIG. 3 is a schematic structure diagram of an LCD device according to the first embodiment of the present invention.

FIG. 3 is a schematic structure diagram of a LCD device according to the first embodiment of the present invention. Referring to FIG. 3, the display device 300 of the present invention includes a display panel 310, a driving circuit 320 and a repair line 330. Besides, the display device 300 can, depending on the application needs, further include at least a first amplifier 340, a first switch 350, a second amplifier 360, a second switch 370 and one of the combinations thereof.

The display panel 310 is, for example, an LCD panel, a PDP, an OELD panel, an IELD panel, a VFD panel, a FED panel and an ECD panel. The display panel 310 has a display region 312 and a peripheral circuit region 314 adjacent to the display region 312. The peripheral circuit region 314 includes a driving circuit bonding region 314*a* and a plurality of conductive wires 316 extending from the display region 312 into the driving circuit bonding region 314*a*. The conductive wires 316 are categorized into data lines D and scan lines S according to the disposed positions and the function thereof.

The driving circuit 320 electrically connected to the display region 312 through the conductive wires 316 in the driving circuit bonding region 314*a* includes at least a driver 322 and control circuit boards 324*a* and 324*b*. The control circuit boards 324*a* and 324*b* drive the display panel 310 through the driver 322; the control circuit board 324*a* controls the signal supplied to the data lines D while the control circuit board 324*b* controls the signal supplied to the scan lines S. Besides, in each driver 322, a first amplifier 340 is disposed. In the embodiment, the driver 322 is a tape automation bonding package (TAB package), which is electrically connected between the control circuit board 324*a* and the driving circuit bonding region 314*a* or between the control circuit board 324*b* and the driving circuit bonding region 314*a*. In another embodiment, the driver 322 can be a flip-chip, which is directly and electrically connected to the driving circuit bonding region 314*a* through "chip on glass" (COG) bonding technology. In a further embodiment, the driver 322 is disposed on the control circuit boards 324*a* and 324*b*, which is "chip on board" (COB) bonding technology. In another embodiment, the driver 322 can be a flip-chip connected to a film and the film is electrically connected between the control circuit board 324*a* and the driving circuit bonding region 314*a* or between the control circuit board 324*b* and the driving circuit bonding region 314*a*, which is "chip on film" (COF) bonding technology.

The repair line 330 is distributed in the peripheral circuit region 314 and the driving circuit 320 and has a repair portion 332 located between the driving circuit bonding region 314*a* and the display region 312. In the embodiment, the repair portion 332 is a disconnected point, while in another embodiment the repair portion 332 is a switch or the like.

The first amplifier 340 is disposed in one or a plurality of drivers 322. At least one of the first amplifiers 340 is electrically connected to the repair line 330 and the first amplifiers 340 electrically connected to the repair line 330 are used for amplifying the signal delivered by the repair line 330. The first switch 350 is disposed on the control circuit boards 324*a* and connected between the first amplifiers 340 and the repair line 330 for deciding whether to output the signal amplified by the first amplifier 340 to the repair line 330 or not.

The second amplifier 360 is disposed on the control circuit board 324*a* and electrically connected to the repair line 330 used for amplifying the signal delivered by the repair line 330. The second switch 370 is disposed on the control circuit board 324*a* and connected between the second amplifier 360 and the repair line 330 for deciding whether to output the signal amplified by the second amplifier 360 to the repair line 330 or not.

When a damaged data line D on the LCD panel 310 is found, a laser welding is performed at two welding points 334*a* and 334*b* for electrically connecting the repair line 330 to the damaged data line D and then at both ends of the repair portion 332 of the repair line 330, a laser beam is used to melt a part of the passivation layer on the repair line 330. Afterwards, a laser chemical vapor deposition (laser CVD) is used to form a thin metal film for connecting both ends of the repair portion 332. Alternatively, a laser welding can be used for welding the two parts of the repair line 330 at both ends of the repair portion 332, which will save the required time of the repair process. When a module process of the display panel 310 is completed, most of the functions of the damaged line still can be restored by the repair line 330. Since the first amplifier 340 and the second amplifier 360 are disposed on the path of the repair line 330, the signal delivered by the repair line 330 can be amplified by the first amplifier 340 and/or the second amplifier 360, therefore less signal attenuation occurs herein, even though the signal is delivered by a long wire. The repaired LCD panel 310 needs to be performed by another cell test for securing whether the welding points 334*a* and 334*b* are properly welded and both ends of the repair portion 332 are properly connected or not. In other words, prior to accomplishing the manufacturing process of the display device 300, the repair status of the display panel 310 can be reliably evaluated by cell tests, thus the time and cost of the successive processes can be significantly reduced.

Since both the first amplifier 340 and the second amplifier 360 are able to independently amplify the signal delivered by the repair line 330, it is available to adjust the first switch 350 or the second switch 370 to allocate which amplifier, the first amplifier 340 and/or the second amplifier 360, to amplify the signal delivered by the repair line 330 after the display panel 310 is repaired. Specifically, if the signal power independently amplified by the first amplifier 340 or the second amplifier 360 is not powerful enough, the signal delivered by the repair line 330 can be amplified by the first amplifier 340 and the second amplifier 360 together after the display panel 310 has been repaired.

Remarkably, although in the embodiment it is assumed that the repair line 330, the first switch 350, the second amplifier 360 and the second switch 370 are located on the control circuit board 324*a*, in fact, the above-described structure of the repair line 330 on the control circuit board 324*a* and the design of the amplifying circuits are applicable to the control circuit board 324*b* too. In addition, the display device 300 in the embodiment may not include the first switch 350 and the second switch 370, so that the signal delivered by the repair line 330 can be directly amplified by the first amplifier 340 or the second amplifier 360 after the display panel 310 is repaired.

The Second Embodiment

Figure 4:
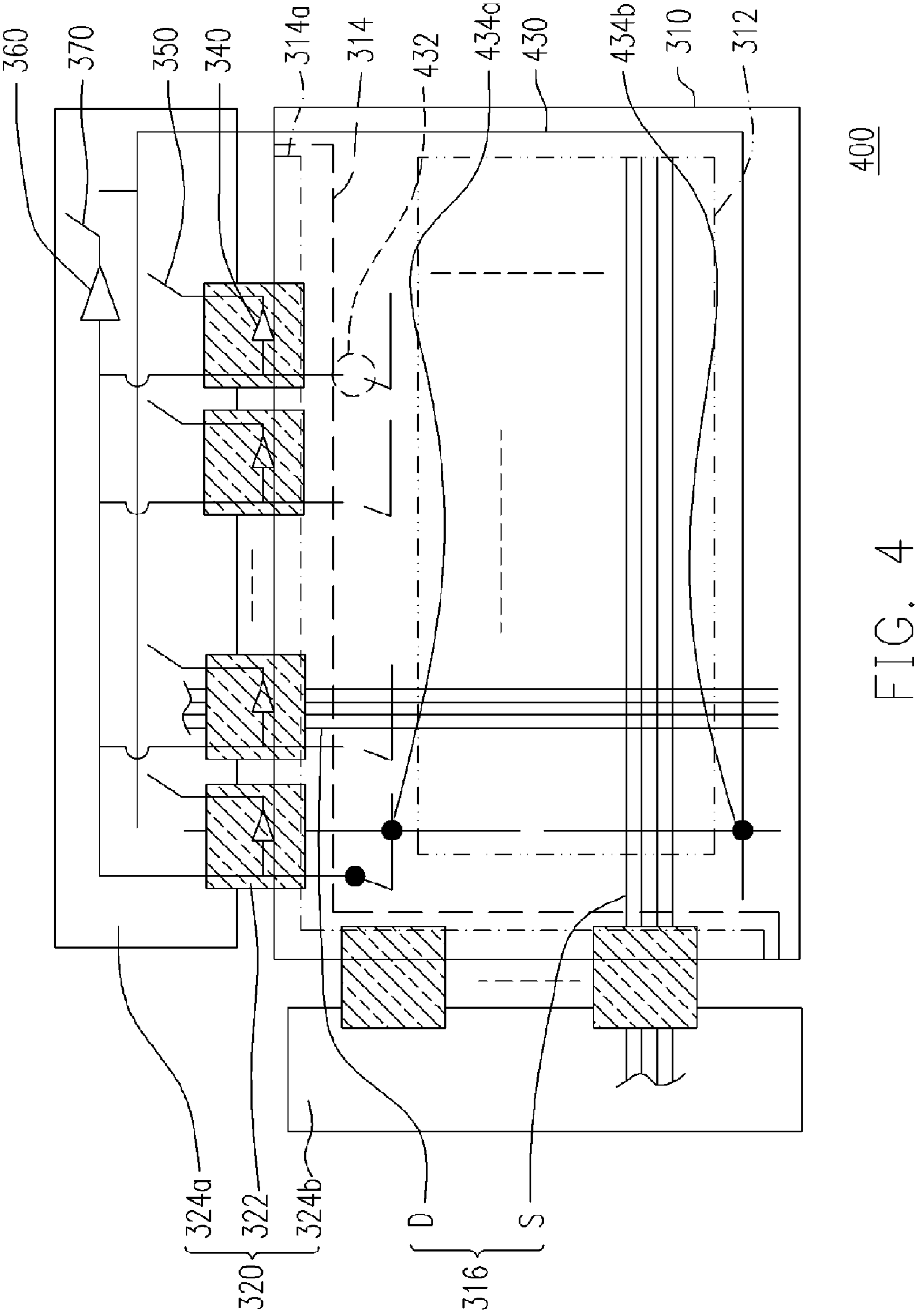
FIG. 4 is a schematic structure diagram of an LCD device according to the second embodiment of the present invention.

FIG. 4 is a schematic structure diagram of an LCD device according to the second embodiment of the present invention. Referring to FIG. 4, the display device 400 of the embodiment is similar to the display device 300 in the first embodiment. The difference between the second embodiment and the first embodiment is that the display device 400 has a plurality of first amplifiers 340 and a plurality of first switches 350. Each amplifier 340 is electrically connected to the repair line 430 and disposed in the corresponding driver 322. Each of the first switches 350 is disposed on the control circuit board 324*a* and connected between the corresponding first amplifier 340 and the repair line 430.

Similar to the first embodiment, after the display panel 310 is repaired, the signal delivered by the repair line 430 can be amplified by the plurality of the first amplifier 340 together or by the second amplifier 360 only depending on a real need and by adjusting the first switch 350 or the second switch 370. In more detail, if the signal power independently amplified by the plurality of the first amplifier 340 together or the second amplifier 360 alone is not powerful enough, the signal delivered by the repair line 430 can be amplified by the plurality of the first amplifier 340 and a second amplifier 360 together by means of adjusting the first switch 350 or the second switch 370.

The method for repairing the open-line defects and the advantages of the repair line 430 are the same as the first embodiment. Moreover, the above-described structure of the repair line 430 on the control circuit board 324*a* and the design of the amplifying circuits are applicable to the control circuit board 324*b* too.

The Third Embodiment

Figure 5:
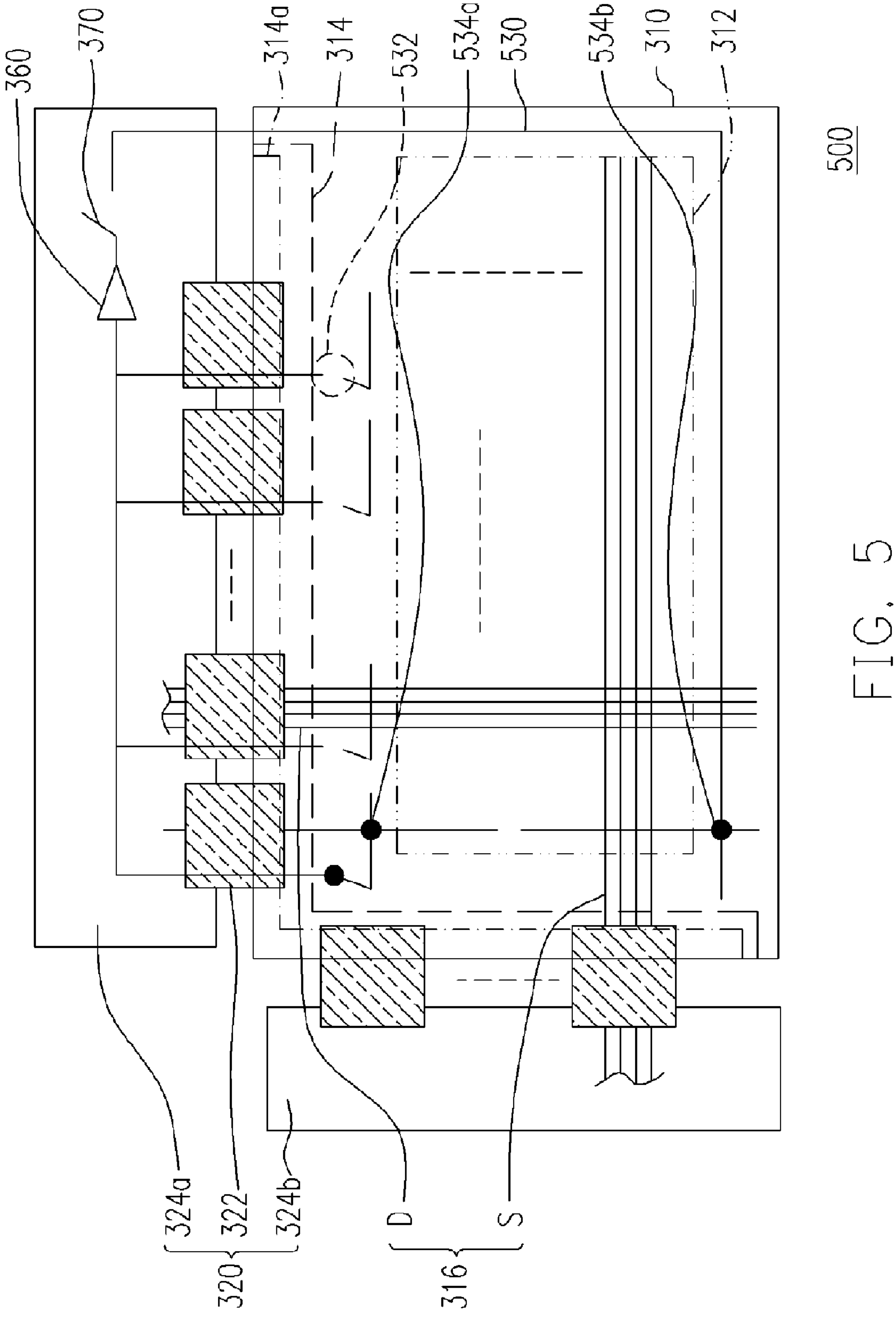
FIG. 5 is a schematic structure diagram of an LCD device according to the third embodiment of the present invention.

FIG. 5 is a schematic structure diagram of an LCD device according to the third embodiment of the present invention. Referring to FIG. 5, the display device 500 of the embodiment is similar to the display device 300 in the first embodiment. The difference between the third embodiment and the second embodiment is that the display device 500 does not have the first amplifier 340 and the first switch 350 in the display device 300; instead, the display device 500 has only a second amplifier 360 and a second switch 370. After the display panel 310 is repaired, the signal delivered by the repair line 530 can be amplified by the second amplifier 360 depending on a real need and by adjusting the second switch 370.

In addition, the method for repairing the open-line defects and the advantages of the repair line 530 are the same as the first embodiment. Moreover, the above-described structure of the repair line 530 on the control circuit board 324*a* and the design of the amplifying circuits are applicable to the control circuit board 324*b* too.

Remarkably, the display device 500 of the embodiment can be without the second switch 370. If it is the case, after the display panel 310 has been repaired, the signal delivered by the repair line 530 would be amplified directly by the second amplifier 360.

The Fourth Embodiment

Figure 6:
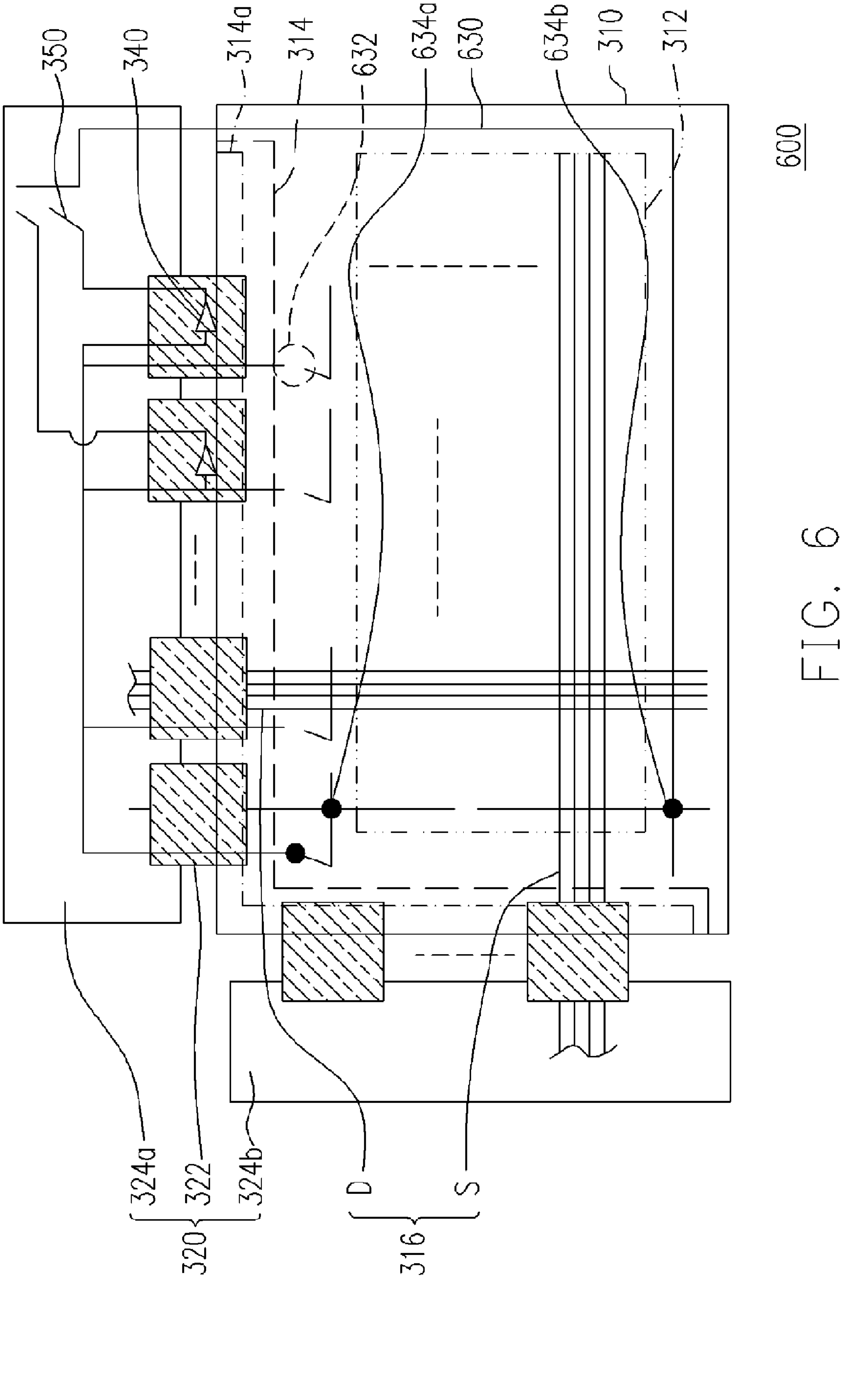
FIG. 6 is a schematic structure diagram of an LCD device according to the fourth embodiment of the present invention.

FIG. 6 is a schematic structure diagram of an LCD device according to the fourth embodiment of the present invention. Referring to FIG. 5, the display device 600 of the embodiment is similar to the display device 300 in the first embodiment. The difference between the fourth embodiment and the third embodiment is that the display device 600 does not have the second amplifier 360 and the second switch 370 in the display device 300; instead, the display device 600 has at least a first amplifier 340 and a first switch 350. The worker can adjust the first switch 350 according to the needs to enable the signal delivered by the repair line 630 be amplified by one or a plurality of the first amplifiers 340.

In addition, the method for repairing the open-line defects and the advantages of the repair line 630 are the same as the first embodiment. Moreover, the above-described structure of the repair line 630 on the control circuit board 324*a* and the design of the amplifying circuits are applicable to the control circuit board 324*b* too.

Remarkably, the display device 600 of the embodiment can be without the first switch 350. If it is the case, during repairing the display panel 310, two parts of the repair line 630 at both ends of the repair portion 632 can be connected to enable the signal delivered by the repair line 630 to be amplified directly by the first amplifier 340.

In short, the display device of the present invention has at least the following advantages:

1. In the display panel of the display device provided by the present invention, at least an amplifier is electrically connected to the repair line, which is capable of solving the attenuation of the signal delivered by the repair line. Thus, the display image quality can be improved.

2. The repair line in the display device provided by the present invention has a repair portion located between the driving circuit bonding region and the display region, which enables the cell test to be carried out to re-examine whether the defects on display panel are fixed or not; thus, additional testing successive process is no longer required. Therefore, the time and cost of the successive processes can be saved.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

What is claimed is:

1. A display device, comprising:

a display panel having a display region and a peripheral circuit region adjacent the display region, wherein the peripheral circuit region has a driving circuit bonding region and a plurality of conductive wires extending from the display region into the driving circuit bonding region;

a driving circuit electrically connected to the display region through the driving circuit bonding region and the conductive wires, the driving circuit comprising at least one driver and a control circuit board, wherein the control circuit board drives the display panel through the at least one driver;

a repair line distributed in the peripheral circuit region and the driving circuit wherein the repair line has a repair portion located between the driving circuit bonding region and the display region;

a first amplifier disposed on the control circuit board of the driving circuit wherein the first amplifier is electrically connected to the repair line for amplifying the signal delivered by the repair line; and a first switch disposed on the control circuit board of the driving circuit wherein the first switch is connected between the first amplifier and the repair line for determining whether to deliver the signal amplified by the first amplifier to the repair line.

2. The display device as recited in claim 1, wherein the repair portion is a disconnected point or a switch.

3. The display device as recited in claim 1, wherein the conductive wires comprise a plurality of data lines or a plurality of scan lines.

4. The display device as recited in claim 1, wherein the driver is a flip-chip electrically connected to the driving circuit bonding region.

5. The display device as recited in claim 1, wherein the driver is a tape automation bonding package electrically connected to the control circuit board and the driving circuit bonding region.

6. The display device as recited in claim 1, wherein the driver is disposed on the control circuit board to electrically connect the driving circuit bonding region.

7. The display device as recited in claim 1, further comprising:

at least one second amplifier disposed in the at least one driver, wherein the second amplifier is electrically connected to the repair line for amplifying the signal delivered by the repair line;

a second switch disposed an the control circuit hoard, wherein the second switch is connected between the second amplifier and the repair line for determining whether to deliver the signal amplified by the second amplifier to the repair line.

8. The display device as recited in claim 1, further comprising:

a plurality of second amplifiers disposed in the at least one driver; wherein the second amplifier is electrically connected to the repair line for amplifying the signal delivered by the repair line;

a plurality of second switches disposed on the control circuit board, wherein each second switch is connected between one of the second amplifiers and the repair line far determining whether to deliver the signal amplified by the second amplifier to the repair line.

9. A display device, comprising:

a display panel having a display region and a peripheral circuit region adjacent the display region, wherein the peripheral circuit region has a driving circuit bonding region and a plurality of conductive wires extending from the display region into the driving circuit bonding region;

a driving circuit electrically connected to the display region through the driving circuit bonding region and the conductive wires, the driving circuit comprising at least one driver and a control circuit board, wherein the control circuit board drives the display panel through the at least one driver;

a repair line distributed in the peripheral circuit region and the driving circuit, wherein the repair line has a repair portion located between the driving circuit bonding region and the display region;

at least one amplifier disposed in the at least one driver of the driving circuit, wherein amplifier is electrically connected to the repair line for amplifying the signal delivered by the repair line; and at least one switch disposed on the control circuit board of the driving circuit, wherein the switch is connected between the amplifier and the repair line for determining whether to deliver the signal amplified by the first amplifier to the repair line.

10. The display device as recited in claim 9, wherein the repair portion is a disconnected point or a switch.

11. The display device as recited in claim 9, wherein the conductive wires comprise a plurality of data lines or a plurality of scan lines.

12. The display device as recited in claim 9, wherein the driver is a flip-chip electrically connected to the driving circuit bonding region.

13. The display device as recited in claim 9, wherein the driver is a tape automation bonding package electrically connected to the control circuit board and the driving circuit bonding region.

14. The display device as recited in claim 9, wherein the driver is disposed on the control circuit board to electrically connect the driving circuit bonding region.

* * * * *